United States Patent [19]

Haase et al.

[11] 4,079,001

[45] Mar. 14, 1978

[54] PROCESS FOR THE PURIFICATION OF INDUSTRIAL EFFLUENTS

[75] Inventors: Jaroslav Haase, Basel; Quentin Bowes, Rheinfelden; Rudolf F. Wurster, Pfeffingen, all of Switzerland

[73] Assignee: Ciba-Geigy Corporation, Ardsley, N.Y.

[21] Appl. No.: 610,791

[22] Filed: Sep. 5, 1975

[30] Foreign Application Priority Data

Sep. 13, 1974 Switzerland .................. 12520/74

[51] Int. Cl.$^2$ .................. C02B 1/60; C02C 5/08
[52] U.S. Cl. .................. 210/36; 210/37 R; 210/502
[58] Field of Search .................. 210/24, 28, 36, 37 R, 210/37 B, 40, 502, 506–508

[56] References Cited

U.S. PATENT DOCUMENTS

| | | | |
|---|---|---|---|
| 3,979,285 | 9/1976 | Wegmuller et al. | 210/36 |
| 3,997,483 | 12/1976 | Wurster et al. | 210/36 |

FOREIGN PATENT DOCUMENTS

| | | |
|---|---|---|
| 1,045,694 | 10/1966 | United Kingdom. |
| 1,147,615 | 4/1969 | United Kingdom. |

*Primary Examiner*—Thomas G. Wyse
*Attorney, Agent, or Firm*—Edward McC. Roberts; Michael W. Glynn; Prabodh I. Almaula

[57] ABSTRACT

A process for the purification of industrial effluents which comprises bringing said effluents into contact with an adsorption material which contains a carrier that is pretreated with a precipitate of a basic nitrogenous polymeric compound with an activated clay mineral.

22 Claims, No Drawings

PROCESS FOR THE PURIFICATION OF INDUSTRIAL EFFLUENTS

The present invention provides a process for the purification of industrial effluents, in particular the decolorisation of waste water occurring in the textile, paper and leather industry and in the manufacture of fluorescent brighteners and dyes, for example filtrates, residual liquors, rinsing and wash waters.

The process according to the invention consists in bringing the effluents into contact with an adsorption material that contains a carrier which has been pretreated with a precipitate of a basic, nitrogenous polymeric compound with an activated clay mineral.

One of the great environmental problems in industrialised areas is the pollution of rivers and lakes. Because the pollution originates from the industrial areas, the purification of industrial effluents is gaining increasing importance at the present time. However, this effluent purification is proving to be exceedingly difficult, especially whenever it is a matter of eliminating organic substances of limited biodegradability that are dissolved in water. Within this nexus of problems there is consequently an urgent need for the decolorisation and purification of effluents that occur in the dyestuff, textile, paper and leather industry.

Different processes have already been proposed for the purification of highly coloured and polluted effluents that occur e.g. in the manufacture and use of dyes and textile or dyeing assistants. It is known, for example, to collect coloured effluent or wash waters in large tanks and to precipitate the dyestuff and assistant residues by addition of suitable flocculants and to separate them by sedimentation, flotation or filtration. However, the drawback of these processes is that the elimination of the sludge is very costly and time-consuming.

The surprising discovery has now been made that a rapid and ample purification of industrial effluents is obtained by bringing these into contact with adsorption materials of the kind mentioned at the outset. Compared with the known agents for example activated charcoal, these adsorption materials are characterized by an increased capacity for adsorbing substances that are dissolved or dispersed in water.

The novel process is suitable above all for purifying liquors which contain organic ionic, i.e., anionic or cationic, substances and mixtures thereof. In particular, it is possible to eliminate to a satisfactory extent from the waste anionic or cationic dyes, optical brighteners, dyeing or textile assistants, surfactants, tannins and mixtures thereof. Effluents which contain mixtures of anionic and/or cationic dyes together with anionic, cationic, and/or non-ionogenic assistants, can be successfully purified according to the invention. However, the process of the present invention makes it possible to remove the substances mentioned hereinabove not only from incompletely exhausted dye, fluorescent brightener and treatment liquors, but to purify to a satisfactory degree the corresponding waste liquors which contain non-ionogenic textile or dyeing assistants and/or non-ionic dyes or fluorescent brighteners, as well as liquors that are diluted by rinsing waters and which usually contain mixtures of dyes and detergents.

Cationic substances can also be eliminated from the effluents by additionally treating the adsorption material to be used according to the invention with an aromatic anionic substance, in particular organic anionic dyes or fluorescent brighteners.

On account of the broad applicability of the novel adsorption material, it is possible to meet the present ever more urgent demand for saving fresh water by a partial to complete recirculation of residual or waste liquors. Independently of the apparatus, these are principally the effluents of the dyestuff, textile, paper and leather industry that occur in connection with dyeing, washing and tanning processes. In the case of a dye-works, these effluents can originate from the conventional dyeing apparatus used for the dyeing of loose fibrous material, tops, yarn, and woven and knitted fabrics, and also from cleaning machines, e.g. an open-width washer.

The effluents to be purified are brought preferably in undiluted form into contact with the adsorption material which can be used according to the invention, optionally after a pH adjustment, e.g. from 2 to 7, especially 3 to 5.

The process according to the invention can be carried out discontinuously, semi-continuously or continuously. In particular, there are three methods of carrying out the process of which procedure a) is preferred:

a. the stirring process, in which the water subject to purification is advantageously stirred in a vessel with the adsorption agent and then the two are separated;
b. the fluid bed process, in which the adsorption agent is generally kept in suspension through the flow of the liquor to be purified;
c. the solid bed process, in which the liquor to be purified is advantageously conducted through an arrangement of a filter-like adsorption material.

If the last of these three processes, the solid bed process c), is applied, then the following three modifications with respect to the apparatus employed are chiefly suitable:

1. The treatment apparatus, e.g. dyeing appliance, is firmly connected to the adsorber device.
2. The adsorber device is movable and can be coupled as required with any treatment apparatus.
3. The effluents originating from the treatment apparatus are combined in a suitable container and then jointly conveyed through the adsorption material.

The purification of the effluents is desirably carried out at 10° C to 150° C. Preferably, however, it is effected between 30° C and 100° C. If desired, the purification of the effluents can be carried out under pressure or in vacuo.

Suitable basic, nitrogeneous polymeric compounds for the manufacture of the adsorption material to be used according to the invention are polymers which contain basic nitrogen atoms capable of salt formation.

Examples of such polymers are water-soluble or water-dispersable basic aminoplasts, e.g. formaldehyde/-dicyandiamide condensation products. It is advantageous to use condensation products of formaldehyde, dicyandiamide and urea or an alkylene polyamine with altogether 2 to 18, preferably 2 to 8, carbon atoms and 2 to 5 amino groups.

The alkylenepolyamines are, for example, ethylene diamine, propylene diamine, butylene diamine, pentylene diamine, hexamethylene diamine, diethylene triamine, triethylene triamine, 1,2-propylene diamine, dipropylene triamine, tripropylene tetramine, dihydroxydipropylene triamine, dibutylene triamine, tributylene triamine, tetrabutylene pentamine, dipentylene triamine, tripentylene tetramine, tetrapentylene pentamine, dihexamethylene triamine, trihexamethylene tetramine and tetrahexamethylene pentamine.

Suitable basic aminoplasts are above all formaldehyde-dicyandiamide-ethylene diamine or formaldehyde-urea-dicyandiamide condensation products. Preferred products are obtained e.g. by condensation of formaldehyde with the reaction product of dicyandiamide and ethylenediamine or the corresponding acid salt, e.g. the hydrochloride or ammonium chloride and are described e.g. in DOS 2 321 627 and French Patent No. 2,189,327. Further basic aminoplasts are manufactured by condensation of urea, dicyandiamide and formaldehyde in the presence of acid e.g. hydrochloric acid, or by condensation of dicyandiamide with formaldehyde and the tetrahydrochloride of triethylene tetramine.

It is likewise possible to use as basic polymers reaction products of halohydrins or dihalohydrins with alkylene- or polyalkylene polyamines or alkylene- or polyalkylene polyimines, for example reaction products of epichlorohydrin and diethylenetriamine, dipropylenetriamine or triethylenetetramine or with polyethylene imines. Such basic reaction products are described, for example, in DAS 1 010 736.

Other basic epoxy resins are epoxidised precondensates of aliphatic polyamines and polyepoxides which are described, for example, in U.S. Pat. No. 3,346,519.

Suitable basic, nitrogeneous polymers are also soluble basic polymers which are manufactured by condensation of dibasic carboxylic acids of 2 to 10 carbon atoms, e.g. adipic acid or functional derivatives thereof, for example esters, amides or anhydrides, with polyamines, especially with polyalkylene polyamines, and which are described, for example, in U.S. Pat. No. 2,882,185.

Especially preferred basic polymers, however, are the polyamidepolyamines, which are obtained by reaction of polymerised, preferably dimerised to trimerised fatty acids with polyamines, advantageously in such a ratio that the resultant polyamide resin has an amino value in the range of about 200 to 650 mg of potassium hydroxide per gram of polyamidepolyamine. As polyamines which can be used for the manufacture of the polyamidepolyamines it is possible to use aromatic polyamines or especially aliphatic polyamines which can also contain heterocyclic structures, e.g. imidazolines. Polymeric fatty acids which are advantageously present in such polyamides are obtained by polymerisation of one or more unsaturated long-chain aliphatic or aromatic-aliphatic acids or esters thereof or other derivatives that can be readily converted into the acid. Suitable examples of such polymeric fatty acids are described in British Patent Nos. 878,985 and 841,554. These polyamidepolyamines can be used by themselves or also in combination with the dicyandiamide condensation products previously mentioned.

The polymeric unsaturated fatty acids used herein are advantageously aliphatic, ethylenically unsaturated dimeric to trimeric fatty acids. Preferably, the polyamidepolyamines are manufactured from polyalkylenepolyamines and aliphatic, ethylenically unsaturated dimeric to trimeric acids which are derived from monocarboxylic acids with 16 to 22 carbon atoms. These monocarboxylic acids are fatty acids with at least one ethylenically unsaturated bond and preferably 2 to 5 such bonds. Examples of this class of acids are oleic acid, hiragonic acid, eleostearic acid, licanoic acid, arachidonic acid, clupadonic acid and especially linoleic and linolenic acid. These fatty acids can be obtained from natural oils in which they occur principally as glycerides.

The dimeric to trimeric fatty acids are obtained in known manner by dimerisation of monocarboxylic acids of the indicated type. The so-called dimeric fatty acids always have a content of trimeric acids and a small content of monomeric acids.

The dimeric to trimeric linoleic or linolenic acids are particularly suitable. The industrial products of these acids contain as a rule 75 to 95 percent by weight of dimeric acids, 4 to 22 percent by weight of trimeric acids and 1 to 3 percent by weight of monomeric acid.

Polymeric fatty acids or esters which are used for the manufacture of the reactive polyamides can also be epoxidsed, for example by reaction with peracetic acid, performic acid or with hydrogen peroxide and formic acid or acetic acid. Suitable epoxidised fatty acids and esters are described in British Pat. Nos 810,348 and 811,797.

Useful polyamides according to the invention can also be condensation products of polymeric fatty acids with polyamines as described in British Patent Nos. 726,570 and 847,028. These products can be reacted with epoxide resins that are formed by reaction of polyvalent phenols with polyfunctional halohydrins and/or glycerol dichlorohydrin and are described in U.S. Pat. Nos. 2,585,115 and 2,589,245.

Further basic polyamide resins which can be used according to the invention are, for example, the products that are obtained by reacting halohydrins, e.g. epichlorohydrin, with aminopolyamides from polyalkyleneamines and aliphatic dicarboxylic acids of 2 to 10 carbon atoms. Such products are described, for example, in U.S. Pat. No. 3,311,594.

Suitable polyamide resins which can be used for the manufacture of the adsorption materials are described, for example, in British Patent Nos. 726,570, 810,348, 811,797, 847,028, 865,656 and 1,108,558.

It is also possible to use in the present invention polyamides obtained by condensation polymerisation at elevated temperatures from a reaction mixture that contains polymeric fatty acids (manufactured according to British Patent Nos. 878,985 and 841,544), monomeric fatty acids and lower polyalkylene polyamines.

Further basic polymers are the polymers of an alkylene imine with advantageously 2 to 4 carbon atoms and having an average moleculer weight of 500 to 200,000, preferably 10,000 to 40,000. These polymers normally have a Brookfield viscosity at 20° C of 500 to 20,000 centipoise. Suitable alkylene imines are in particular ethylene imine, propylene imine, 1,2-butylene imine and 2,3 butylene imine. Of all alkylene imines, ethylene imine is used for preference.

Suitable basic polymers for the clay complex formation are also addition polymers and copolymers, for example optionally quaternised copolymers of N-substituted maleic imides and ethylenically unsaturated monomers, e.g. styrene, which contain in the molecule recurring units of the formula

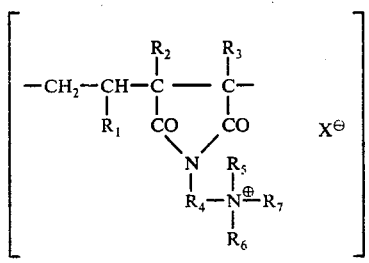

wherein $R_1$ represents hydrogen, alkyl of 1 to 4 carbon atoms or phenyl, each of $R_2$ and $R_3$ independently represents hydrogen or alkyl of 1 to 4 carbon atoms, $R_4$ represents alkylene of 2 to 4 carbon atoms, $R_5$ and $R_6$ represent hydrogen or preferably alkyl of 1 to 4 carbon atoms, $R_7$ represents alkyl of 1 to 4 carbon atoms, benzyl or $-CH_2 CONH_2$, and $X^-$ represents an anion, e.g. a halogenide ion, such as a chloride ion.

The clay minerals required for the manufacture of the adsorption material are normally activated in order to make possible the precipitation with the basic, nitrogenous polymers to form clay complex compounds. The activation of the clay minerals is effected by treating crude clay minerals of any origin with inorganic chemicals. In doing so, the divalent cations are replaced by monovalent cations, e.g. by sodium, potassium, ammonium or hydrogen ions. The particle size of the clay mineral in the aqueous medium is advantageously at least 0.05 $\mu$. Suitable inorganic chemicals for activating the clay minerals are, for example, carbonates, phosphates and halides of alkali metals or alkali metal hydrogen carbonates, and above all mineral acids, for example hydrochloric acid. Examples of suitable clay minerals are: beidellite, hectorite, saponite, sauconite, volkhonskoite, medmontite, pimelite, nontronite, vermiculite, chlorite, allevardite, illite, gluconite, attapulgite, sepiolite, preferably a montmorillonite-type mineral and especially bentonite or montmorillonite.

Such clay minerals possess as a rule an ion exchange capacity of at least 20 millequivalents /100 g of silicate.

The precipitate of a basic polymer with a clay mineral is effected preferably by precipitating a polymeric compound with an activated clay mineral in the presence of an inorganic or organic carrier. In this manner, sparingly water-soluble associates are obtained which are precipitated onto the carrier materials. The formation of the clay complex can also take place in the absence of the carrier material. In this case, the polymer assosiates are subsequently applied to the carrier material.

The precipitation is advantageously carried out at room temperature (20°-25° C); but it can also be effected at elevated temperature up to 100° C.

The amount of basic polymers used is advantageously at least 2 per cent by weight, based on the total weight of the dry adsorption material. The preferred amount is 5 to 60 percent by weight of basic polymers. The clay minerals required for the precipitation are used with advantage in amounts of 4 to 50, preferably 10 to 25, percent by weight, based on the total weight of the dry adsorption material.

If desired, the clay minerals can be used in combination with polyanionic polymers.

Preferred polyanionic polymers are above all substituted or unsubstituted homo- and copolymers of aliphatic $\alpha,\beta$-ethylenically unsaturated carboxylic acids, advantageously in the form of their alkali metal salts, especially the sodium and potassium salts, or in the form of their ammonium salts, if appropriate in admixture with corresponding free polycarboxylic acids.

Primarily there are used water-soluble homopolymers of acrylic acid which are optionally substituted by alkyl groups or halogen, for example homopolymers of the following monomers: acrylic acid, methacrylic acid, $\alpha$-ethylacrylic acid, $\alpha$-isopropylacrylic acid, $\alpha$-butylacrylic acid and $\alpha$-chloroacrylic acid and $\alpha$-chloroacrylic acid. water-soluble homopolymers of acrylic or methacrylic acid with an average molecular weight of 20,000 to 1,000,000, in particular those with an average molecular weight of 50,000 to 150,000, are particularly preferred.

Suitable copolymeric aliphatic, $\alpha,\beta$-ethylenically unsaturated carboxylic acids are above all copolymerisation products of acrylic acid and methacrylic acid, as well as copolymerisation products of acrylic acid or methacrylic acid with a further substituted acrylic acid cited hereinbefore.

Further polyanionic copolymerisation products are obtained by copolymerisation of acrylic or methacrylic acid with further water-soluble or water-insoluble, copolymerisable comonomers that contain vinyl groups. Examples of water-soluble comonomers are:

a. comonomers that contain sulphonic acid groups, e.g. styrenesulphonic acid;

b. comonomers that contain carboxylic acid groups, e.g. crotonic acid;

c. comonomers that contain carboxylic acid amide groups and N-hydroxyalkyl derivatives thereof, e.g. acrylic amide, methacrylic amide, N-hydroxymethylacrylic amide, N-$\beta$-hydroxyethylacrylic amide, N-$\gamma$-hydroxypropylacrylic amide, N,N-bis-$\beta$-hydroxyethylacrylic amide, N-hydroxymethylmethacrylic amide, N-$\beta$-hydroxyethylmethacrylic amide, N-$\gamma$-hydroxypropylmethacrylic amide and N,N-bis-$\beta$-hydroxyethylmethacrylic amide;

d. water-soluble, especially sulphonated derivatives of $\beta$-hydroxyalkylacrylic or -methacrylic amides which are obtained, for example, by condensation of acrylic or methacrylic acid halides, especially chlorides, with reaction products of alkanolamines and chlorosulphonic acid;

e. copolymerisable aldehydes, e.g. acrolein or croton aldehyde.

Examples of suitable water-insoluble comonomers are:

i. acrylic or methacrylic alkyl esters with 1 to 12 carbon atoms in the alkyl moiety which can optionally be still further substituted, in particular by hydroxy groups, e.g. the methyl ester, ethyl ester, $\beta$-hydroxyethyl ester, n-butyl ester and dodecyl ester of acrylic or methacrylic acid;

ii. vinyl esters of aliphatic carboxylic acids with 1 to 12 carbon atoms or mixtures of such carboxylic acids, e.g. vinyl acetate, vinyl formiate, vinyl butyrate, or vinyl esters of a carboxylic acid mixture with 9 to 11 carbon atoms;

iii. vinyl benzenes, e.g. styrene, chlorostyrene or methylstyrene.

As polyanionic copolymerisation products it is also possible to use copolymers of dibasic carboxylic acids and functional derivatives thereof, e.g. maleic acid, maleic anhydride, maleic acid monoalkyl esters and amides, fumaric acid, itaconic acid, citraconic acid, with aliphatic or araliphatic olefins.

The manufacture of the cited polyanionic polymers can be carried out in known manner in aqueous solution or suspension with the action of catalysts, preferably radical-forming catalysts, e.g. hydrogen peroxide, ammonium persulfate, potassium persulphate or organic peroxides, e.g. dibenzoyl peroxide, or with the use of ammonium persulphate and sodium hydrogen sulphite, and advantageously at a temperature between 40° C and 100° C.

Carboxyalkylated cellulose derivatives can be used as further polyanionic polymers. Carboxylic cellulose, which is normally used in the form of its water-soluble alkali metal salts, e.g. the sodium or potassium salts, is particularly suitable. Such carboxymethyl cellulose derivatives advantageously have a degree of substitution (DS) of 0.4 to 2; carboxymethyl salts with a DS of 0.7 to 1.2 are preferred. (Definition of the degree of substitution DS according to Encyc. of Polym. Sci. and Technol., vol. 3, page 468). The amount of polyanionic polymer used varies with advantage between 10 to 75% by weight, based on the clay mineral.

Suitable carrier materials for the manufacture of the adsorption material are e.g. inorganic fillers, nonionogenic synthetic plastics, but preferably cellulosic materials or also carbonaceous substances as well as mixtures of such carriers.

The cellulosic substances to be used as carrier materials are desirably bleached or unbleached pine sulphite cellulose, kraft cellulose, waste paper or peat, groundwood, chips, wood fibres, wood flour, cork powder, bark or tailings. The cellulose or waste paper is advantageously converted into a form suitable for the treatment with the clay complex, especially into a fibre suspension. The waste paper is pulped in a machine suitable for the purpose, for a example in a hydrapulper. The cellulose can be in the form of a granulate, filter paper or paper pulp. Activated charcoal, lignite, anthracite, coke, carbon black and the like can be used as carbonaceous substances.

It is also possible to use as carrier materials synthetic plastics that do not contain groups which form ionogenic salts in water, i.e., which contain neither groups that exhibit acid dissociation in water, e.g. sulphonic acid, carboxylic acid or phosphonic acid groups, nor onium groups, e.g. ammonium, sulphonium or phosphonium groups.

Such non-ionogenic plastics can belong to the most varied known classes of regenerated and man-made synthetic fibres. These include polycondensates, polymers and polyadducts which can be both duroplasts and thermoplastics. Examples of suitable regenerated man-made plastics are cellulose esters, e.g. cellulose nitrate, cellulose acetate, cellulose triacetate, celluloseacetobutyrate, cellulose propionate, cellulose ethers, e.g. methyl cellulose, ethyl cellulose and benzyl cellulose. Advantageously these plastics are man-made thermoplastics which are used in the form of filament cable, fibre webs, sponges, loose fibres, slivers or wads, as well as beads, granulates or amorphous particles. As examples of possible thermoplastics there may be cited: linear polyesters, polyolefins, polyacrylonitrile, polyamide, polystyrene or polyurethane.

Also suitable are water-insoluble condensation polymers, e.g. of urea or melamine and formaldehyde. Preferably, these plastics are in a form having a large specific surface area, e.g. in the form of finely structured agglomerates of almost spherical particles.

Suitable inorganic fillers for the manufacture of the adsorption material are above all white fillers, e.g. titanium dioxide, silicon dioxide (quartz, diatomaceous earth, kieselguhr), zinc oxide, aluminium hydroxides, barium sulphate or carbonate, calcium carbonate or sulphate, magnesium carbonate, dolomite, aluminium silicates or hydrosilicates, mica, powdered slate, calcium silicates, magensium silicates (talcum, asbestos powder), clay and kaolin types like terra alba, porcelain clay, China clay, bolus alba, also silica, silica gel, silicic acid and fuller's earth.

To manufacture particularly efficient adsorption material with high retention it has proved advantageous to use a combination of the polymer clay complexes cited hereinbefore with salts of polyvalent metals, e.g. aluminium sulphate, aluminium chloride, iron sulphate, iron chloride, magnesium sulphate, magnesium chloride and calcium chloride, which can be hydrolysed with an inorganic or organic base, for example ammonium hydroxide.

The amount of metal salts used varies with advantage between 10 to 300% by weight, preferably 50 to 200% by weight, based on the total amount of the absorption material.

If desired, the adsorption material to be used according to the invention can be mixed with activated charcoal powder. In this case, the activated charcoal is added to the adsorption material in amounts of 2 to 95, preferably 10 to 70, percent by weight, based on the total weight of the adsorption material.

Possible dyes that can be removed by the effluents with the adsorption material according to the invention are anionic or cationic dyes that are both soluble and dispersible in water or fluorescent brighteners. The process according to the invention is preferably used for removing water-soluble, in particular anionic, dyes or optical brighteners.

The anionic dyes that are removed according to the invention are dyes whose anionic character is dependent on metal complex formation alone and/or on the acid substituents that effect the water-solubility. Suitable acid substituents that effect the water-solubility are carboxylic acid groups, phosphoric acid groups, acylated sulphonic acid imide groups, e.g. alkyl- or aryldisulphimide groups or alkyl- or arylcarbonylsulphimide groups, alkyl-or arylimide groups, sulphonic acid ester and above all sulphonic acid groups.

The anionic dyes can belong to the most widely different classes of dye. As examples there may be mentioned oxazine, triphenylmethane, xanthene, nitro, acridone, stilbene, perinone, naphthoquinone imine, phthalocyanine, anthraquinone and azo dyes. These last mentioned dyes can be metal free, metallisable or metalliferous monoazo, disazo and polyazo dyes, including formazane dyes, in which the metal atom forms a 1:1 or 1:2 complex, especially 1:2 chromium or 1:2 cobalt complexes which contain two similar or two different molecules of azo dye bonded as complex to a chromium or a cobalt atom. These dyes also contain in the molecule so-called reactive groups which form a covalent bond with the fibrous material to be dyed.

The cationic dyes that can be removed from the effluents with the aid of the adsorption material are as a general rule the customary salts and metal halides, for example zinc chloride double salts, of the known cationic dyes the cationic character of which derives from a carbonium, an oxonium, a sulphonium and, above all, an ammonium group. Examples of such chromophoric systems are: methine, azomethine, azo, hydrazone, azine, oxazine, thiazine, diazine, xanthene, acridine, polyarylmethane, e.g. diphenylmethane or triphenylmethane, and also cumarin and azo dyes that contain an indolinium, triazolium, tetrazolium, oxadiazolium, thiadiazolium, oxazolium, thiazolium, pyridinium or pyranzinium ring. They can also be arylazo, phthalocyanin and anthraquinone dyes which carry, for example, an external cycloammonium or alkylammonium group.

The adsorption material is suitable not only for decolorising residual liquors occurring in the dyestuffs, textile, paper and leather industry, but furtheremore is also most useful when it is a matter of eliminating residues of anionic or cationic fluorescent brighteners from wash and bleach liquors. Particularly satisfactory results are obtained in the elimination of fluorescent brighteners of anionic character.

The fluorescent brighteners can belong to any class of brightener compounds. The anionic brighteners are in particular stilbene compounds, cumarins, benzocumarins, pyrazines, pyrazolines, oxazines, dibenzoxazolyl or dibenzimidazolyl compounds or naphthalic imides which contain in the molecule at least one acid group, e.g. a carboxylic acid or preferably a sulphonic acid group, and can be fibre reactive. The cationic brighteners are primarily those of the methine, azamethine, benzofuran, benzimidazolyl, cumarin, naphthalimide or pyrazoline class.

A further advantage of the adsorption material according to the invention is that, besides the dyes, it permits also a partial elimination of non-ionic, anionic and cationic surfactants and textile and dyeing assistants from aqueous waste liquors. Such assistants are described in more detail in "Tenside-Textilhilfsmittel-Waschrohstoffe" by Dr. Kurt Lidner (published by Wissenschaftlicher Verlagsgesellschaft Stuttgart, 1964). Compounds with a particularly interesting utility are those of the alkylarylsulphonic acid type.

The adsorption agent can also be effective in the elimination of anionic synthetic tannins, especially tannins that carry one or more sulpho groups in the molecule. A more detailed description of these compounds can be found e.g. in "Ullmans Encyclopadie der technischen Chemie", Vol. 11, pp. 595-598.

Appropriate choice of the adsorption material makes it possible to extract up to 100% of the impurities from the effluents. Retardant effects of up to 50 g of waste matter, i.e., dye, fluorescent brightener, assistant, detergent, tannin per 100 g of adsorption material can be achieved. Whenever a complete decolorisation or removal of the waste substances cannot be accomplished by a single treatment of the waste liquor with the adsorption material, it is advisable to repeat the cleansing procedure. The amount of adsorption material used can be reduced to a minimum by means of a recirculation.

In the following manufacturing Directions and Examples, the percentages are by weight.

MANUFACTURING DIRECTIONS

A. A suspension of 46.5 g of bleached pine sulphite cellulose in 2000 ml of water is treated, with stirring, with 115.4 ml of a 13% colloidal aqueous solution of a polyamidopolyamine from polymerised linoleic acid/linolenic acid and triethylenetetramine with an amino value of 350 to 400 mg of KOH/g. Stirring of the cellulose suspension is continued for 5 hours at a temperature of 23° C. Then 1000 ml of a 0.5% colloidal aqueous solution of activated magnesium bentonite is stirred into the suspension in the course of 3 minutes. After 10 minutes the pH of the suspension is adjusted to 9.5 with normal sulphuric acid. The mass is subsequently squeezed out to a weight of 208.2 g using a vacuum suction filter. The solids content of the absorption material is 65.9 g (=99.1% of theory).

B. By substituting 10 g of activated montmorillonite clay for the 5 g of magnesium bentonite in A) and adjusting the pH of the suspension to 4, there are obtained 161.6 g of moist adsorption material. Solids content: 71.1 g (=100) of theory).

C. By substituting the same amount of peat for the 46.5 g of cellulose in A) and 10 g of activated montmorillonite clay for the 5 g of magnesium bentonite, and otherwise carrying out the same procedure, there are obtained 309.6 g of moist adsorption material. Solids content: 68.1 g.

D. By substituting the same amount of asbestos for the 46.5 g of cellulose in A) and carrying out the pretreatment in accordance with B), there are obtained 177.5 g of moist adsorption materials. Solids content: 71.0 g.

E. A suspension of 50 g of bleached pine sulphite cellulose in 2.4 l of water is treated, with stirring, with 100 ml of a 5% colloidal aqueous solution of a polyamidepolyamine of the composition described in A). The suspension is stirred for 5 hours at room temperature. Subsequently 500 ml of a 1% aqueous suspension of activated montmorillonite clay is stirred into the suspension in the course of 15 minutes. After app. 10 minutes, 100 ml of a 3.35% aqueous $AlCl_3$ solution is added dropwise in the course of 3 minutes and the pH of the suspension is then adjusted to 9.5 by addition of aqueous ammonia. The mass is subsequently squeezed out to a weight of 245 g using a vacuum suction filter. Solids content: 25%.

F. By substituting 50 g of an insoluble condensation polymer of formaldehyde and urea (specific surface area greater than 22 $m^2$/g) for the cellulose in E), and otherwise carrying out the same procedure, there are obtained 191.5 g of moist adsorption material. Solids content: 25%.

G. By substituting a mixture of 25 g of asbestos and 25 g of cellulose for the cellulose in E), and otherwise carrying out the same procedure, there are obtained 236 g of moist adsorption material. Solids content: 25%.

H. By substituting 50 g of kieselguhr for the cellulose in E), and otherwise carrying out the same procedure, there are obtained 2.36 g of moist adsorption material. Solids content: 25%.

I. By substituting 50 g of polyethylene glycol terephthalate fibres (3 denier, 3 mm staple length) for the cellulose in E), and otherwise carrying out the same procedure, there are obtained 246 g of moist adsorption material. Solids content: 25%.

J. By substituting 50g of wood fibres (pulped mechanically and with the application of heat in the presence of water) for the cellulose in E), and otherwise carrying out the same procedure, there are obtained 258 g of moist adsorption material. Solids content: 25%.

K. By substituting the same amount of a basic polyamide manufactured from adipic acid, diethylene triamine and epichlorohydrin in accordance with U.S. Pat. No. 3,311,594, Example 4, for the polyamidepolyamine in E), and otherwise carrying out the same procedure, there are obtained 244 g of moist adsorption material. Solids content: 25%.

L. By substituting the same amount of a basic condensation product obtained from tetraethylene pentamine and epoxidised dihydroxy-diphenyl-dimethylmethane according to U.S. Pat. No. 3,346,519, Example IIa, for the polyamidepolyamine in E), and otherwise carrying out the same procedure, there are obtained 222 g of moist adsorption material. Solids content: 25%.

M. By substituting the same amount of a dicyandiamide/ethylenediamine dihydrochloride/formaldehyde condensation product manufactured in accordance with DOS 2,321,627, Direction B, for the polyamidepolyamine in E), and otherwise carrying out the same procedure, there are obtained 239 g of moist adsorption material. Solids content: 25%.

N. By substituting the same amount of a polyethyleneimine with an average molecular weight of 30,000 – 40,000, for the polyamidepolyamine in E), and otherwise carrying out the same procedure, there are obtained 231 g of moist adsorption material. Solids content: 25%.

O. By substituting the same amount of a dipropylene triamine/epichlorohydrin basic condensation product obtained in accordance with DAS 1,010,736, Example 2, for the polyamidepolyamine in E), and otherwise carrying out the same procedure, there are obtained 233 g of moist adsorption material. Solids content: 25%.

P. By substituting the same amount of an adipic acid/diethylene triamine basic condensation product obtained in accordance with U.S. Pat. No. 2,882,185, Example 3, for the polyamidepolyamine in E, and otherwise carrying out the same procedure, there are obtained 231 g of moist adsorption material. Solids content: 25%.

Q. By substituting a quaternary copolymer of the formula

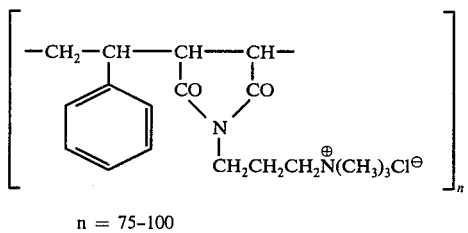

n = 75-100 for the polyamidepolyamine in E), and otherwise carrying out the same procedure, there are obtained 237 g of moist adsorption material. Solids content: 25%.

R. With stirring, 500 ml of a 1% aqueous suspension of activated montmorillonite clay are added dropwise at 25° C to a solution of 5 g of the polyamidepolyamine of the composition described in A) in 2.4 l of water. Then 100 ml of a 3.35% aqueous solution of AlCl$_3$ are stirred in and the pH of the suspension is adjusted to 9.5 with aqueous ammonia. Then 50 g of bleached pine sulphite cellulose are added and the mass is thoroughly stirred for 5 hours. The pretreated cellulose is subsequently concentrated to a weight of 250 g in a vacuum suction filter. Solids content: 25%.

S. By substituting 500 ml of a 1% suspension of attapulgite for the montmorillonite clay in E), and otherwise carrying out the same procedure, there are obtained 242 g of moist adsorption material. Solids content: 25%.

T. By substituting a mixture of 0.84 g of polymethacrylic acid with a molecular weight of 80 – 100,000 and 0.84 g of activated montmorillonite clay for the montmorillonite clay in E), and otherwise carrying out the same procedure, there are obtained 227 g of moist adsorption material. Solids content: 25%.

EXAMPLE 1

50 liters of a dark red residual liquor, adjusted to a pH of 3.5, which contains 5 g of the dye of the formula

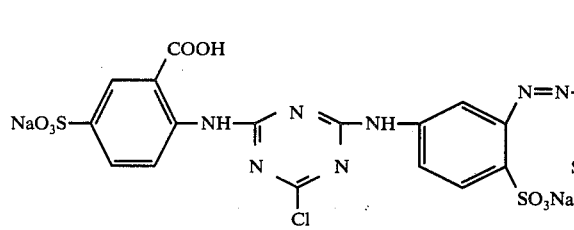

(1)

in dissolved form is put into an agitator vessel. This residual liquor is brought to a temperature of 80° C and, with good stirring, treated with 52.1 g of the moist adsorption material manufactured according to Direction A which has been thoroughly deaggregated beforehand with an impeller in app. 1 liter of water. A sample taken after about 10 minutes through a folded filter shows a 100% decolorisation.

EXAMPLE 2

The residual liquor described in Example 1 is completely decolorised in about 3 minutes by substituting 37.5 g of the moist adsorption material manufacturing according to Direction B for the 52.1 g of adsorption material of Direction A.

EXAMPLE 3

By substituting in Example 1 56.2 g of the moist adsorption material manufactured according to Direction B for the 52.1 g of the adsorption material of Direction A, and carrying out the decolorising at 30° C, the dyestuff concentration of the residual liquor is reduced to 5 mg/l after a contact time of 10 minutes.

EXAMPLE 4

A residual liquor with a dyestuff concentration of 5 mg/l is obtained after a contact time of 10 minutes at a temperature of 30° C by substituting in Example 1 109.8 g of the moist adsorption agent manufactured according to Direction C for the 52.1 g of the adsorption material of Direction A.

EXAMPLE 5

A residual liquor which is completely decolorised is obtained after a contact time of 10 minutes at a temperature of 30° C by substituting in Example 1 61.8 g of the moist adsorption agent manufactured according to Direction D for the 52.1 g of adsorption material of Direction A.

EXAMPLE 6

50 liters of a dark red residual liquor, adjusted to a pH of 3.5, which contains in dissolved form 5 g of the dye described in Example 1 together with 800 g of sodium chloride and 2.5 g of an anionic surfactant of the formula

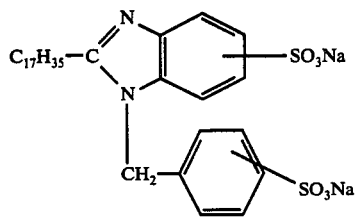
(2)

are put into an agitator vessel. Then 56.2 of the moist adsorption material manufactured according to Direction B are stirred into this warm residual liquor of 30° C. After 1 minute, the residual liquor has a dyestuff content of less than 1 mg/l.

EXAMPLE 7

50 liters of a blue residual liquor, adjusted to a pH of 3.5, which contains in dissolved form 5 g of the dye of the formula

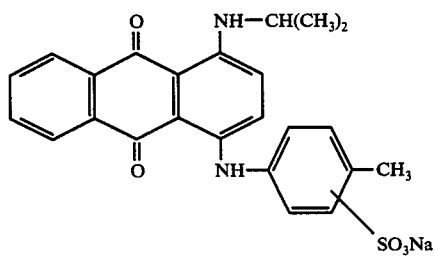
(3)

together with 25 g of the dyeing assistant of the composition:

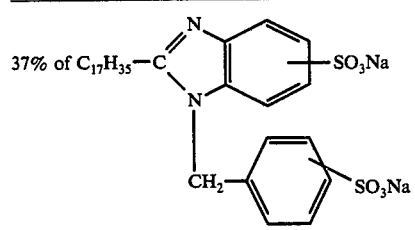
(4)

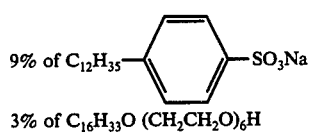
(5)

3% of $C_{16}H_{33}O(CH_2CH_2O)_6H$ (6)

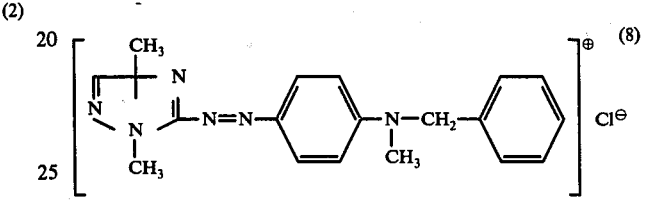
(7)

42% of water are put into an agitator vessel. Then 56.2 g of the moist adsorption material manufactured according to Direction B are stirred into the liquor. A sample taken after 10 minutes is completely decolorised.

EXAMPLE 8

10 liters of a red residual liquor, adjusted to a pH of 3.5, which contains in dissolved form 1 g of the dye of the formula $$\left[ \begin{array}{c} CH_3 \\ N \\ N \\ N \\ CH_3 \end{array} \underset{CH_3}{N} - N=N- \underset{}{\phantom{X}} - N-CH_2- \underset{CH_3}{\phantom{X}} \right]^{\oplus} Cl^{\ominus}$$
(8)

are put into an agitator vessel. At a temperature of 30° C, 22.8 g of the moist adsorption material manufactured according to Direction B are stirred in. A sample taken after 10 minutes shows a dyestuff concentration of 78 mg/l.

EXAMPLES 9 to 24

In each of these Examples, 50 liters of a dark red residual liquor, adjusted to a pH of 3.5, which contains 20 mg/l of the dye described in Example 1 are put into an agitator vessel. On each occasion, the respective dye liquor is heated to a temperature of 50° C and stirred with 60 g of one of the adsorbents listed in Table 1. In each experiment a sample is taken after an adsorption time of 10 minutes and filtered through a folding filter. The dyestuff concentration indicated in the last column of Table 1 is determined in the filtrate.

Table 1

| Example No. | Adsorbent Manufactured according to | Residual dyestuff concentration in mg/l |
|---|---|---|
| 9 | Direction E | 0 |
| 10 | Direction F | 0 |
| 11 | Direction G | 0 |
| 12 | Direction H | 3 |
| 13 | Direction I | 0.6 |
| 14 | Direction J | 0.8 |
| 15 | Direction K | 2.2 |
| 16 | Direction L | 1 |
| 17 | Direction M | 0.6 |
| 18 | Direction N | 1.6 |
| 19 | Direction O | 1.4 |
| 20 | Direction P | 1.2 |
| 21 | Direction Q | 2.2 |
| 22 | Direction R | 0.4 |
| 23 | Direction S | 0.2 |
| 24 | Direction T | 0.2 |

EXAMPLE 25

50 liters of a residual liquor which contains in dissolved form 20 mg/l of a fluorescent brightener of the formula

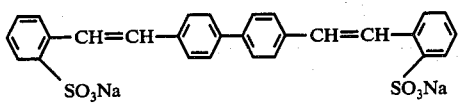

(9)

are treated with 60 g of the moist adsorbent manufactured according to Direction E, as described in Examples 9 to 24. After a contact time of 10 minutes, a fluorescent brightener concentration of 0.2 mg/l is determined in the filtrate.

EXAMPLE 26

50 liters of a violet, warm printing effluent of 48° C with a total organic carbon content of 39 mg/l are brought into contact as described in Examples 9 to 24 with 60 g of the moist adsorbent manufactured according to Direction E. After a treatment time of 10 minutes a filtrate sample is completely colourless and has a total organic carbon (TOC) content of only 8 mg/l.

EXAMPLE 27

40 g of the moist adsorbent manufactured according to Direction E are processed to a filter of 6 cm diameter through which are passed 5 liters of each of the residual liquors described in Examples 9 to 24 at a temperature of 80° C. The rate of flow is adjusted to 2.5 liters per hour. The resultant filtrates are completely colourless.

EXAMPLES 28 to 31

A dark blue dyestuff solution which contains 50 mg/l of the dye of the formula

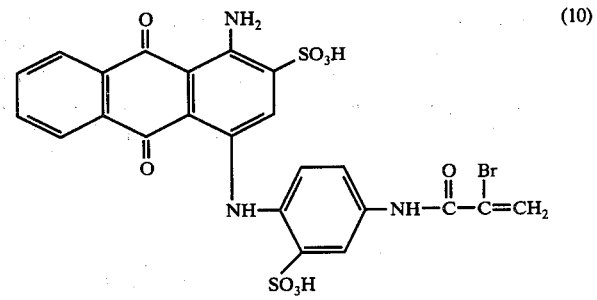

(10)

and 50 mg/l of the dye of the formula

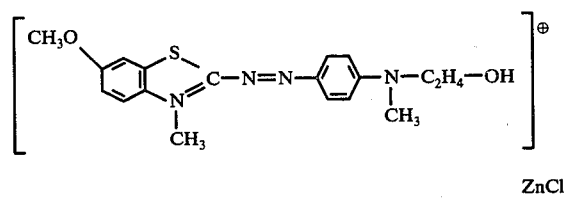

(11)

and which has a pH of 3.5 is passed, for comparison purposes, at a temperature of 85° C to 90° C and a rate of flow of app. 2 liters/hr over 10 g (based on the solids content) of each of the adsorbents listed in Table 2. The amounts of the completely decolorised filtrates in liters are indicated in the third column of the Table.

Table 2

| Example No. | Adsorbent | Decolorised filtrate in liters |
|---|---|---|
| 28 | 10 g of adsorbent manufactured according to Direction E | 4.2 |
| 29 | 8 g of adsorbent manufactured according to Direction E in admixture with 2 g of activated charcoal powder | 7.6 |
| 30 | 10 g of untreated cellulose | 0 |
| 31 | 10 g of adsorbent K manufactured according to DOS 2 321 627 | 0.1 |

We claim:

1. A process for the purification of industrial effluents which comprises bringing said effluents into contact with an adsorption material containing a cellulosic carrier material which has been pretreated with a clay complex compound precipitate of
   A. polyamidopolyamines of a polymeric fatty acid and a polyamine; and
   B. a monovalent cation containing activated clay mineral, possessing an ion exchange capacity of at least 20 milliequivalents/100 g of silicate.

2. The process of claim 1, wherein the effluents are waste liquors which occur in the textile, paper or leather industry or in the manufacture of dyes or optical brighteners.

3. The process of claim 1, wherein the effluents are waste liquors which contain organic ionic substances.

4. The process of claim 3, wherein the effluents contain anionic or cationic dyes, optical brighteners, textile or dyeing assistants, surfactants, tannins or mixtures of such ionic substances.

5. The process of claim 1, wherein the effluents contain mixtures of anionic and/or cationic dyes with anionic, cationic and/or non-ionogenic assistants.

6. The process of claim 1, wherein the purification of the effluents is carried out at 10° to 150° C.

7. The process of claim 6, wherein the temperature is from 30° to 100° C.

8. The process of claim 1, wherein the purification is carried out by a stirring process or a solid bed process.

9. The process of claim 1, wherein the adsorption material additionally contains activated charcoal.

10. The process of claim 1, wherein the basic polymer is a polyamide of a dibasic carboxylic acid which contains 2 to 10 carbon atoms and a polyamine.

11. The process of claim 1, wherein the polyamidepolyamine has an amino value in the range of 200 to 650 milligrams of potassium hydroxide per gram of polyamidepolyamine.

12. The process of claim 1, wherein the adsorption material contains additionally a salt of a polyvalent metal.

13. The process of claim 1, wherein the adsorption material contains additionally a hydrated oxide of a polyvalent metal.

14. The process of claim 1, wherein the adsorption material contains additionally a salt of a polyvalent metal and activated charcoal.

15. The process of claim 1, wherein the adsorption material contains additionally a hydrated oxide of a polyvalent metal and activated charcoal.

16. The process of claim 1, wherein the activated clay mineral is an activated montmorillonite-type mineral.

17. The process of claim 16, wherein the activated clay mineral is activated bentonite or activated montmorillonite.

18. A process according to claim 1 for removing a contaminant from an aqueous effluent comprising the steps of
   a. providing an adsorption agent by adding together said cellulosic carrier material, said polyamidopolyamines and said activated clay mineral, and
   b. adding the adsorption agent to the aqueous effluent.

19. The process of claim 18, wherein the adsorption agent of step (a) is provided by mixing a polyvalent metal salt or a hydrated oxide of a polyvalent metal with the carrier material which is pretreated with the polyamidopolyamine and the activated clay mineral.

20. The process of claim 19 comprising the subsequent addition of activated charcoal in step (a).

21. The process of claim 18 comprising the subsequent addition of activated charcoal in step (a).

22. The process of claim 18 comprising the further final step of separating the used adsorption agent from the purified aqueous effluent.

* * * * *